(12) United States Patent
Trifiletti et al.

(10) Patent No.: US 8,396,501 B2
(45) Date of Patent: Mar. 12, 2013

(54) METHOD AND DEVICE FOR GROUP CALL INITIATION

(75) Inventors: Joshua J. Trifiletti, Miami Beach, FL (US); David E. Klein, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 539 days.

(21) Appl. No.: 12/635,420

(22) Filed: Dec. 10, 2009

(65) Prior Publication Data

US 2011/0143803 A1    Jun. 16, 2011

(51) Int. Cl.
*H04B 7/00* (2006.01)
*H04K 3/00* (2006.01)

(52) U.S. Cl. ........................................ 455/518; 370/341

(58) Field of Classification Search .......... 455/518–520; 370/340–341
See application file for complete search history.

(56) References Cited

U.S. PATENT DOCUMENTS 5,214,790 A    5/1993 Kozlowski
2004/0203793 A1*  10/2004 Dorenbosch ................. 455/445
2006/0178161 A1    8/2006 Jung

FOREIGN PATENT DOCUMENTS

EP           1182895 A1    2/2002
KR       20060090010 A     8/2006

OTHER PUBLICATIONS

International Search Report and Written Opinion for counterpart International Patent Application No. PCT/US2010/056839 mailed on Jun. 27, 2011.
International Preliminary Report on Patentability and Written Opinion for counterpart International Patent Application No. PCT/US2010/056839 mailed on Jun. 21, 2012.

* cited by examiner

*Primary Examiner* — Lee Nguyen
(74) *Attorney, Agent, or Firm* — Valerie M. Davis; Kenneth A. Haas

(57) ABSTRACT

Upon a user's command, a communication device accesses a call list having a plurality identifiers and receives a user's selection of a talkgroup identifier from the call list. The communication device switches to a first channel associated with the selected talkgroup identifier to allow a call on the first channel. When the call ends, the communication device sets a first timer and monitors the first channel for voice activity, and if voice activity is detected, continues the call on the first channel. When the first timer expires and no voice activity is detected, the communication device sets a second timer and scans a home channel for voice activity; and if no voice activity is detected, the communication device continues to monitor the first channel until the second timer expires or voice activity is detected on the home channel, then it automatically switches to the home channel.

11 Claims, 4 Drawing Sheets

METHOD AND DEVICE FOR GROUP CALL INITIATION

FIELD OF THE DISCLOSURE

The present disclosure relates generally to managing a group call in a communication device and more particularly to a method for group call initiation in a communication device.

BACKGROUND

Communication devices, such as push-to-talk radio devices, are crucial for effective communication in critical places and circumstances. For example, two-way radio devices, commonly known as walkie-talkies, are extensively used by defense departments, disaster management agencies, traffic police, hospitals, and the like, for public safety and relief. In certain circumstances, such as during emergency incidents, certain statically configured or dynamically determined groups of personnel (e.g., talkgroups) from such agencies may need to communicate. Two-way radio devices can facilitate such group communications.

However, there are certain drawbacks in initiating talkgroup calls in existing two-way radio devices. One of the primary drawbacks is the necessity of manual user navigation between channels, such as a user having to manually navigate from a home channel to a temporary talkgroup channel for the group call and/or having to manually navigate back to the home channel after the talkgroup call ends.

Accordingly, there is a need for an improved method for group call initiation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
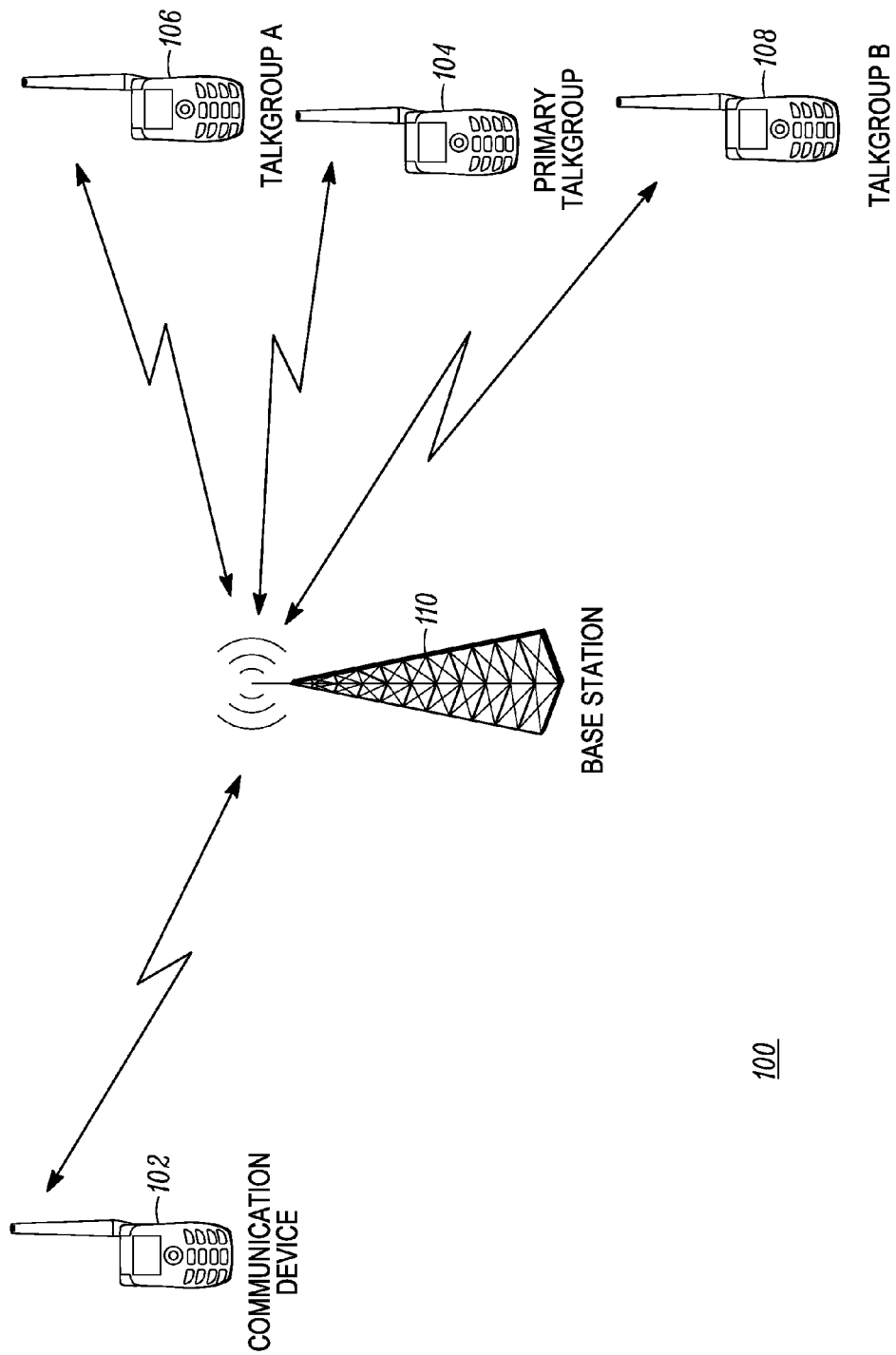
FIG. 1 is a network diagram illustrating a communication system used for facilitating group call initiation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments, a method for group call initiation in a communication device is provided. In an embodiment, upon a user's command, a communication device accesses a call list having a plurality of identifiers and receives a user's selection of a talkgroup identifier from the call list. The communication device switches to a first channel associated with the selected talkgroup identifier to allow a call on the first channel. When the call ends, the communication device sets a first timer and monitors the first channel for voice activity. If voice activity is detected on the first channel, the communication device continues the call with the talkgroup and resets the first timer when the call ends. When the first timer expires and no voice activity is detected on the first channel, the communication device sets a second timer and scans a home channel for voice activity. If no voice activity is detected on the home channel, the communication device continues to automatically switch between monitoring the first channel and scanning the home channel, using the second timer, until the second timer expires or voice activity is detected on the home channel, wherein the communication device automatically switches to the home channel.

Referring now to the figures, FIG. 1 is a network diagram illustrating a communication system 100 used to facilitate initiation of group calls in accordance with embodiments of the present disclosure. The communication system includes a communication device 102, a communication device 104 having a user that is a member of a primary talkgroup, a communication device 106 having a user that is a member of a talkgroup A, and a communication device 104 having a user that is a member of a talkgroup B. The communication device 102 communicates with the members 104 to 108 of the respective talkgroups via an infrastructure device 110 in the system 100. Infrastructure device may 100 may be, for instance, equipment commonly referred to as a base station, a base radio, a base transceiver station, a repeater, an access point, a router, and the like depending on the type of communication system being implemented and the communication protocols and air interfaces used in the communication system. System 100 may also includes a number of other infrastructure devices (not shown) for facilitating communications between the communication devices, such as, bridges, switches, zone controllers, base station controllers, or any other type of infrastructure equipment.

Communication system 100 can be any type of communication system, and in this described embodiment is a trunked radio system. The communication devices 102 to 108 can be any standard communication device such as radios, mobile stations, subscriber units, mobile phones, Personal Digital Assistants (PDAs), laptops, two-way radios, cell phones, and the like. In present embodiment, the communication device 102 is a subscriber unit, more particularly, a push-to-talk radio, in the trunked radio system. The talkgroups are various trunk groups, each group having a plurality of communication devices, similar to the communication devices 102 to 104. In an embodiment, the primary talkgroup is the default talkgroup with which the communication device 102 connects on a home channel, wherein a "channel" is the wireless medium used to carry information at a given channel frequency from a sending communication device to a receiving communication device. The talkgroup A and the talkgroup B are secondary talkgroups with which the communication device 106 communicates occasionally. The communication device 102 connects with the talkgroups A, B 106 and 108 on their respective frequency channels.

Figure 2:
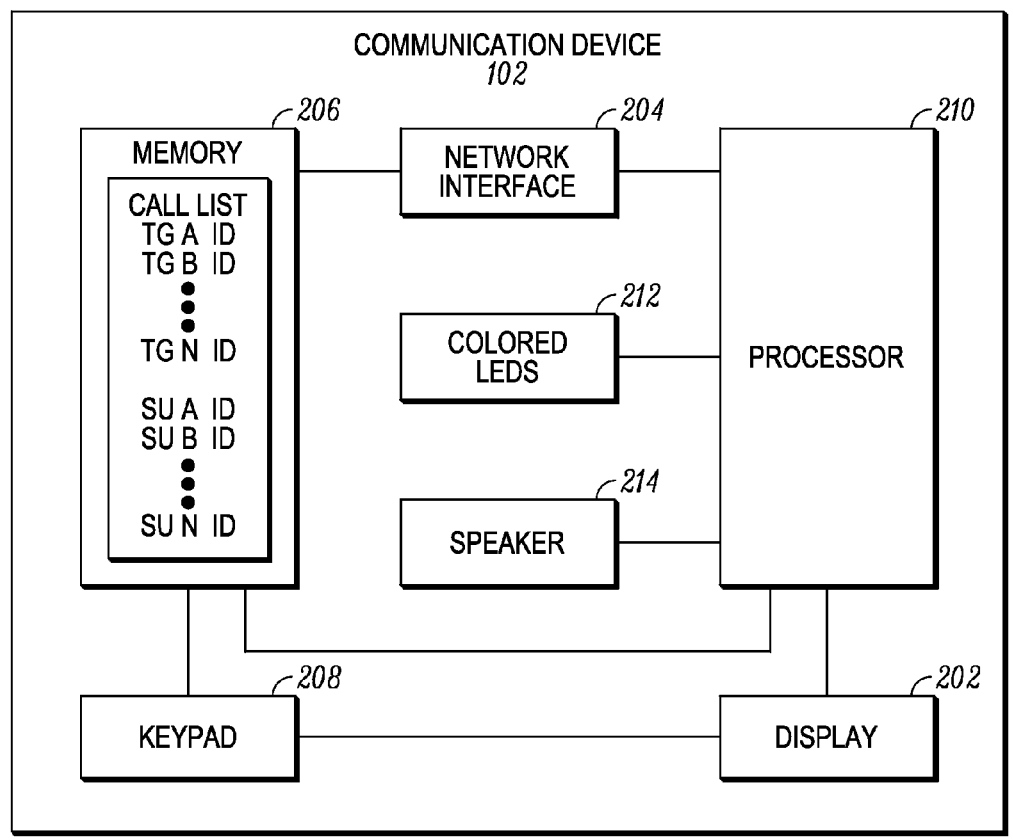
FIG. 2 is a block diagram of a communication device in accordance with some embodiments.

FIG. 2 is a block diagram of a communication device, such as a communication device 102. In an embodiment, the communication device 102 includes a network interface 204 coupled to a memory 206 and a processor 210, a keypad 208, a display 202, colored LEDs 212, and a speaker 214. The network interface 204 can be used for communicating with the members of the talkgroups and the base station 110. The implementation of the network interface 204 depends on the particular type of network, i.e., wired and/or wireless, to which the communication device 102 is connected. For example, where the network supports wired communications, the network interface 202 may comprise a serial port interface (e.g., compliant to the RS-232 standard), a parallel port interface, an Ethernet interface, a USB interface, and/or a FireWire interface, and the like. Where the network supports wireless communications, the network interface 202 comprises elements including processing, modulating, and transceiver elements that are operable in accordance with any one or more standard or proprietary wireless interfaces, wherein some of the functionality of the processing, modulating, and transceiver elements may be performed in processor 210 through programmed logic such as software applications.

The memory 206 includes a call list comprising a plurality of identifiers (IDs) used to enter a call with one or more other communication devices, such as communication devices 106 to 108. In an embodiment, the call list includes talkgroup (TG) IDs as well as IDs for individual subscriber units (SUs). As shown, memory 206 includes talkgroup IDs for talkgroup A and talkgroup B, and the primary talkgroup (not shown) as well as subscriber unit IDs for individual subscriber units A and B (not shown) in the system. Memory 206 may further comprise software for programming the processing device with the logic needed to perform its functionality. The processor 210 can be programmed with logic or in one or more application specific integrated circuits (or some combination) for implementing methods (such as method 300 described below by reference to FIGS. 3 and 4) for accelerating group call initiation in accordance with the teachings herein.

The keypad 208 has a plurality of touch buttons, a touch screen, or the like, bearing alphanumeric characters and navigation arrows enabling a user to enter information and navigate through various options available on a user interface on the display 210.

The colored LEDs 212 on the communication device 102 exhibit various color combinations or light sequences to provide a visual indication of current operating status of the communication device 102 to a user. For instance, a green colored LED may indicate that the communication device 102 is connected onto the home channel, while a yellow colored LED may indicate that the communication device 102 is connected onto a first channel, corresponding to the talkgroup A. Similarly, the speaker 214 provides an audio indication of the current operating status of the communication device 102 to the user by generating different sound patterns. For instance, the speaker 214 may generate a single beep when connected onto the home channel, and generate a double beep when connected onto the first channel.

Figure 3:
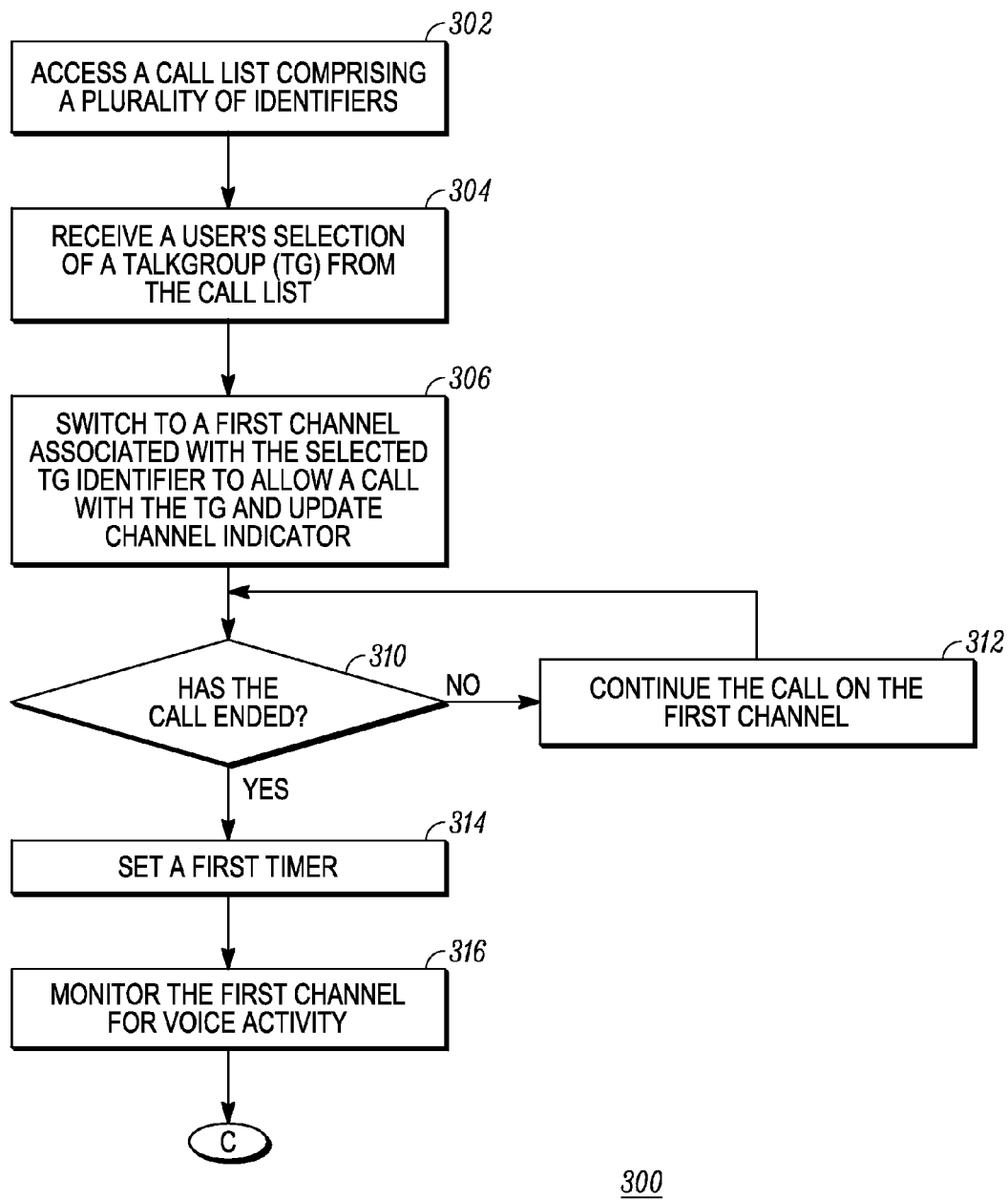
FIG. 3 illustrates a flow diagram of a method for group call initiation in accordance with some embodiments.
Figure 4:
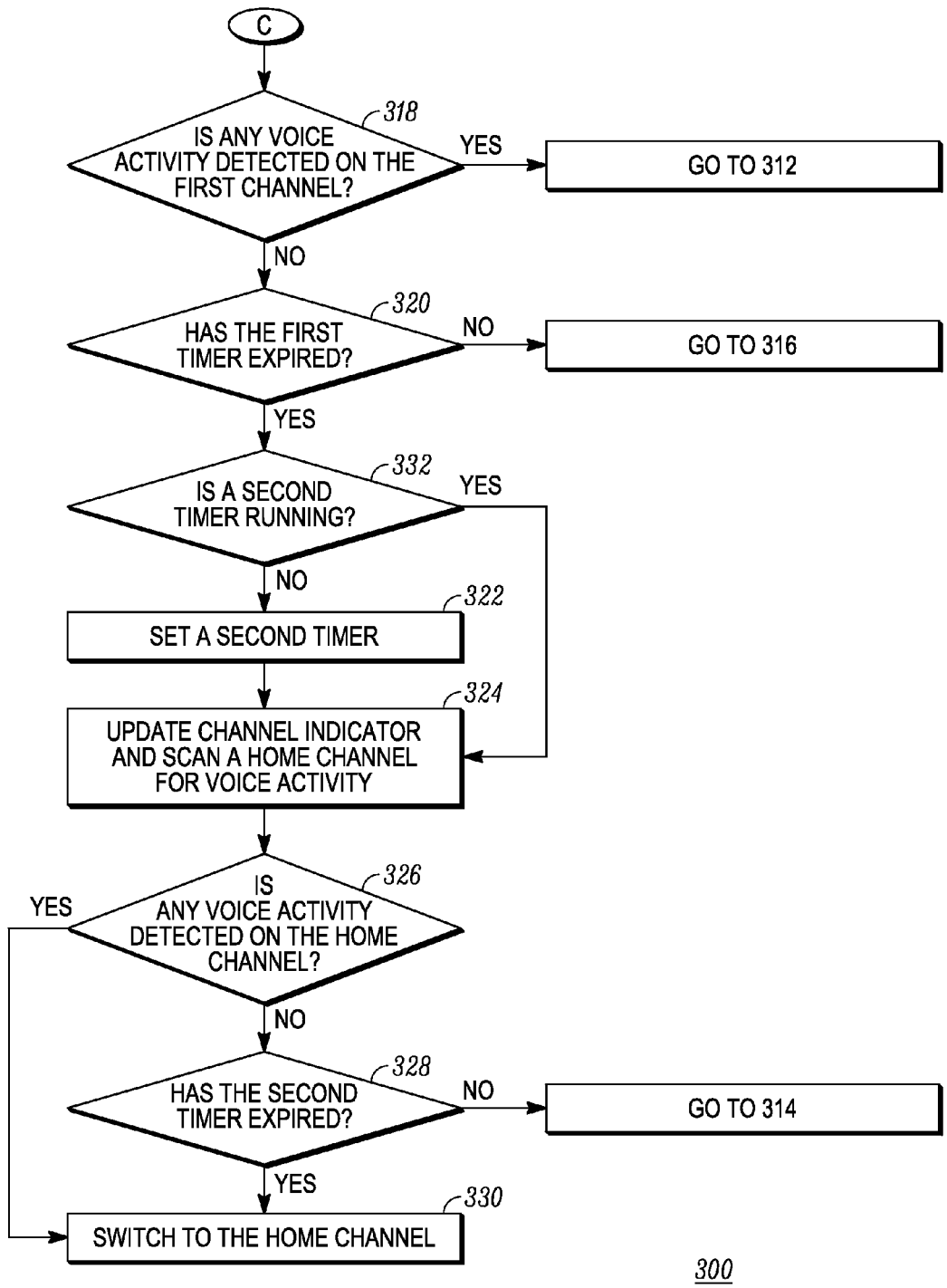
FIG. 4 further illustrates the flow diagram of the method for group call initiation in accordance with some embodiments.

FIGS. 3 and 4 show a flow diagram 300 for a method of accelerating group call initiation in a communication device, e.g., 102. For the purpose of understanding, the flow diagram 300 is explained in accordance with FIGS. 1 and 2. Upon initiation or a command by a user via the keypad 208, the communication device accesses (302) the call list stored in the memory 206 of the communication device 102, which is displayed to the user on the display 202. As mentioned previously, the call list comprises a plurality of identifiers used to enter a call with other communication devices. These identifiers can include subscriber IDs for individual subscriber units and talkgroup IDs for talkgroups, such as talkgroups A, B, and the primary talkgroup. The identifiers can be represented by a certain arrangement of symbols such as alphanumeric symbols, a binary number having a certain number of bits, etc. For example, the talkgroup A can have its talkgroup ID as "TG-A". In an embodiment, the call list includes identifiers for recently called contacts and recently received calls.

The user selects a talkgroup ID from the call list, which is received (304) at the communication device 102. The talkgroup ID represents a group of individuals having subscriber units that are connected in the trunked radio system and share a common channel. For instance, the user can select identifier "TG-A" from the call list to connect to the talkgroup A.

On selecting the talkgroup ID, the communication device 102 automatically switches (306) to a first channel associated with the selected talkgroup. In an implementation, the communication device 102 is connected to the primary talkgroup on a home channel by default. When the user selects the identifier "TG-A" from the call list, the communication device 104 automatically switches from the home channel to the first channel associated with the talkgroup A. The user is hence placed in a call with the talkgroup A. In addition, one or more indicators in the communication device 102 notify the user that the communication device 102 is now connected to the first channel. For instance, the colored LEDs 212 may turn on yellow colored LEDs to indicate that the communication device 102 is connected onto the first channel. Alternatively or in addition, the speaker 214 may generate a specific sound pattern to indicate that the communication device 102 is connected onto the first channel. Such visual and audio indicators can be controlled via an algorithm running on the processor 210.

After placing the call, the communication device 102 checks (310) whether the call with the talkgroup A has ended. If the call has not ended, the communication device remains on the first channel and continues (312) with the call on the first channel. If the communication device 102 detects that the call has ended, it sets (314) a first timer with a pre-determined time period. The first timer can be included in the processor 210.

After setting the first timer, the communication device 102 monitors (316) the first channel for voice activity. For instance, although the call has already been detected to have ended, the communication device 102 monitors the first channel for any voice activity to ensure that the call has not been dropped erroneously or that a new call has not started within the time period of the first timer. Accordingly, while monitoring the first channel, the communication device 102 checks (318) whether any voice activity is detected on the first channel. If the voice activity is detected, the communication device 102 continues (312) the call with the talkgroup A on the first channel. On the other hand, if the communication 102 fails to detect any voice activity on the first channel, it periodically checks (320) whether the first timer has expired. If the first timer has not expired, the communication device 102 continues to monitor (316) the first channel for any voice activity.

However, if the first timer has expired, the communication device 102 checks (332) whether a second timer is running. The second timer also has a pre-determined time period, and is also included in the processor 210. In an embodiment, the time period for the second timer is greater than the time period for the first timer.

If the communication device 102 determines that the second timer is not running, it sets (322) the second timer with the pre-specified time period. Thereafter, the communication device scans (324) the home channel for any voice activity. The one or more indicators notify the user that the communication device 102 is scanning the home channel. For instance, the colored LEDs 212 begin blinking green colored LEDs to indicate scanning operation. Alternatively or in addition, the speaker 214 may generate a specific sound pattern indicative of the scanning operation.

Thereafter, communication device 102 checks (326) if any voice activity is detected on the home channel. In case any voice activity is detected on the home channel, the communication devices automatically switches (330) to the home channel. The indicators (visual or audio) change their status accordingly to notify the user that the communication device 102 is now connected onto the home channel.

On the other hand, if the communication device 102 fails to detect any voice activity on the home channel, it checks (328) whether the second timer has expired. If the second timer has not expired, the communication devices sets (314) the first timer again and re-iterates the whole process henceforth beginning with monitoring (316) the first channel for voice activity. However, if the second timer has expired, the communication device 102 switches (330) to the home channel.

It is to be noted that by using the first and second timers, the communication device 102 is able to constantly monitor the currently connected channel and the home channel simultaneously. Moreover, the communication device 102 automatically switches from one channel to another; therefore, the user is rendered free from the hassles of switching the channels back and forth manually. Furthermore, by virtue of visual and audio indicators, the user remains well aware of current operating status of the communication device 102.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for initiating a group call in a communication device, the method comprising:
   at the communication device:
   accessing a call list comprising a plurality of identifiers used to enter a call with at least one other communication device;
   receiving a user's selection of an identifier for a talkgroup from the call list;
   switching to a first channel associated with the selected identifier to allow a call with the talkgroup;
   when the call ends, setting a first timer and monitoring the first channel for voice activity, and if voice activity is detected, remaining on the first channel to allow the call with the talkgroup, and resetting the first timer when the call ends;

when the first timer expires and no voice activity is detected on the first channel, setting a second timer and scanning a home channel for voice activity, and if no voice activity is detected on the home channel, continuing to automatically switch between monitoring the first channel and scanning the home channel, using the second timer, until the second timer expires or voice activity is detected on the home channel, then automatically switching to the home channel.

2. The method of claim 1 further comprising providing, to a user of the communication device, an indicator identifying whether the communication device is connected to the first channel or the home channel.

3. The method of claim 2, wherein the indicator is a visual indicator.

4. The method of claim 3, wherein the visual indicator comprises a first color when the communication device is connected to the first channel and a second different color when the communication device is connected to the home channel.

5. The method of claim 2, wherein the indicator is an audio indicator that comprises a first sound pattern when the communication device is connected to the first channel and a second different sound pattern when the communication device is connected to the home channel.

6. A communication device comprising:
a memory that stores a call list comprising a plurality of identifiers used to enter a call with at least one other communication device; and
a processor configured to:
access the call list to allow selection of an identifier for a talkgroup from the call list;
switch to a first channel associated with the selected identifier to allow a call with the talkgroup;
when the call ends, set a first timer and monitor the first channel for voice activity, and if voice activity is detected, remain on the first channel to allow the call with the talkgroup, and reset the first timer when the call ends;
when the first timer expires and no voice activity is detected on the first channel, set a second timer and scan a home channel for voice activity, and if no voice activity is detected on the home channel, continue to automatically switch between monitoring the first channel and scanning the home channel, using the second timer, until the second timer expires or voice activity is detected on the home channel, then automatically switch to the home channel;
an indicator that identifies whether the communication device is connected to the first channel or the home channel.

7. The communication device of claim 6, wherein the indicator is a visual indicator comprising a light sequence.

8. The communication device of claim 7, wherein the light sequence comprises a first color when the communication device is connected to the first channel and a second different color when the communication device is connected to the home channel.

9. The communication device of claim 6, wherein the indicator is a speaker that generates a first sound pattern when the communication device is connected to the first channel and a second different sound pattern when the communication device is connected to the home channel.

10. The communication device of claim 6, wherein the communication device is a subscriber unit.

11. The communication device of claim 10, wherein the subscriber unit is a push-to-talk radio.

* * * * *